April 27, 1954  J. E. SHAFER  2,676,853
BEARING MOUNTING
Filed Nov. 24, 1950  2 Sheets-Sheet 2
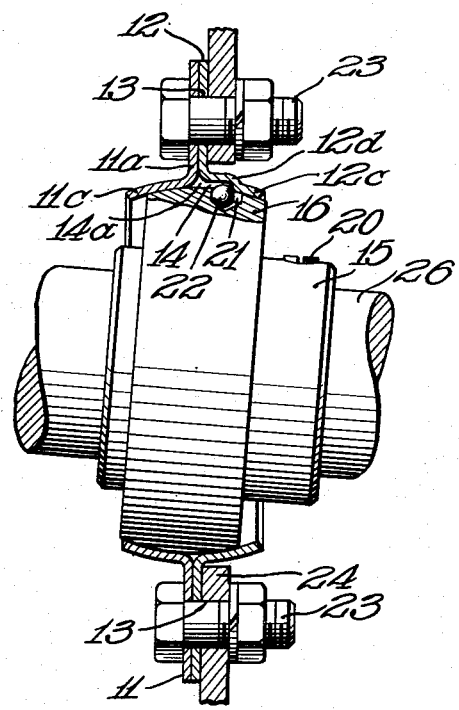
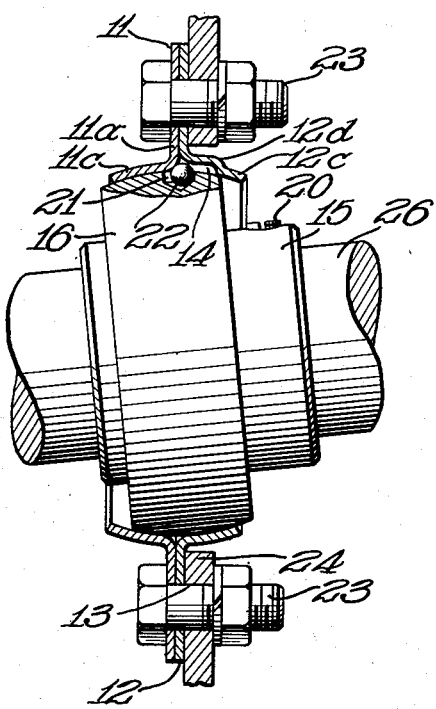
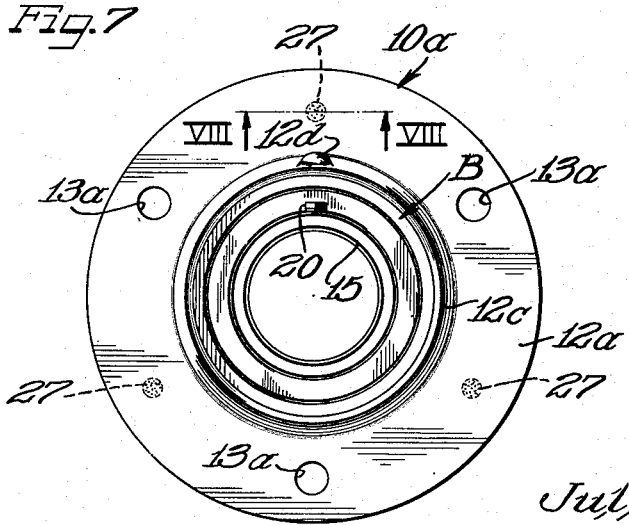
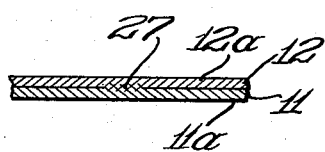
Inventor:
Julius E. Shafer
by Hill, Sherman, Meroni, Gross & Simpson
Attys Patented Apr. 27, 1954

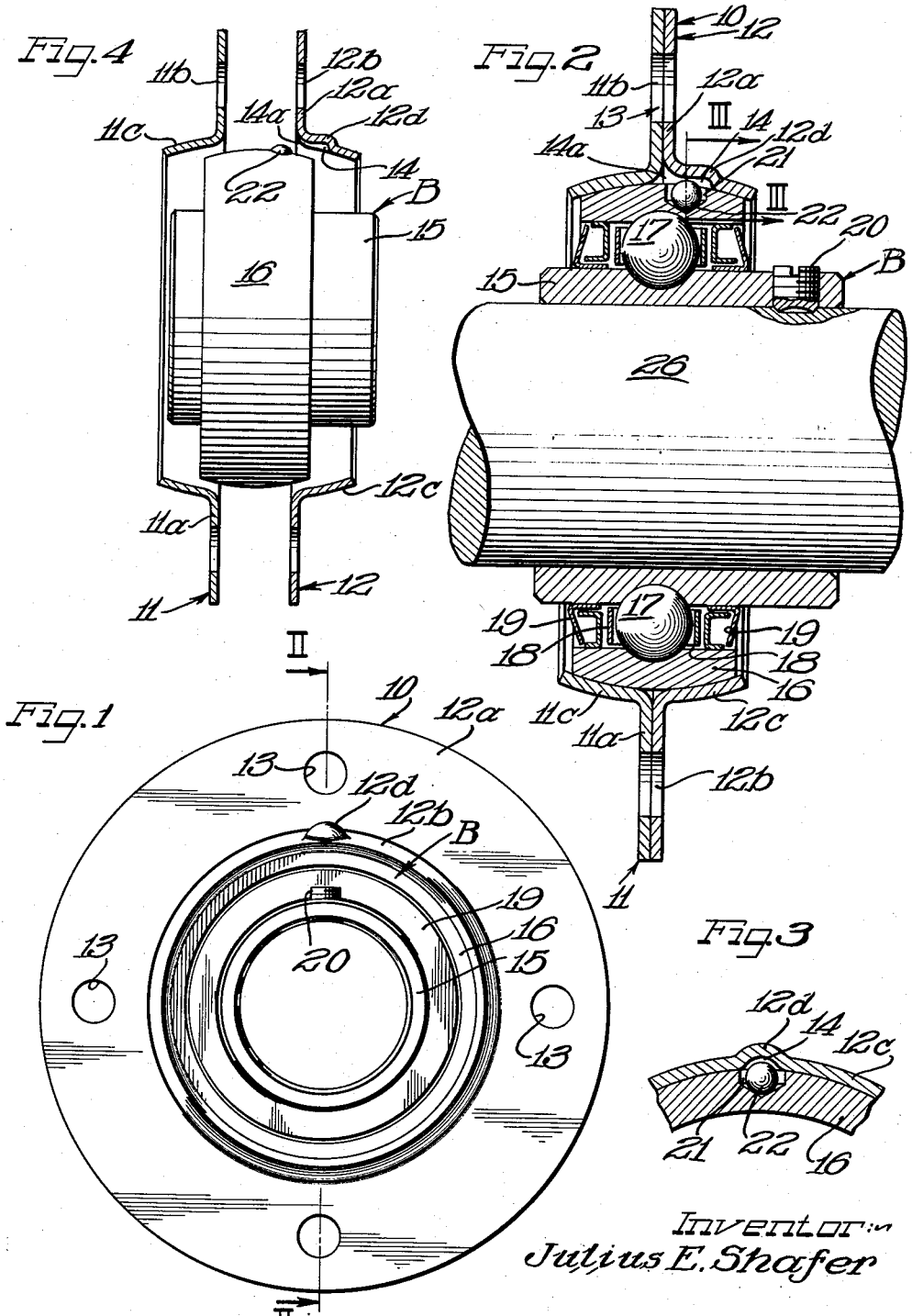

2,676,853

UNITED STATES PATENT OFFICE 2,676,853

BEARING MOUNTING

Julius E. Shafer, Chicago, Ill.

Application November 24, 1950, Serial No. 197,289

2 Claims. (Cl. 308—72)

This invention relates to mountings for bearing units which accommodate limited tilting of the units while holding the units against creep or rotation.

Specifically the invention relates to a flange mounting for a bearing unit wherein a metal ball in a dimple in the bearing unit coacts with a localized recess in a collar of the flange mounting to hold the outer race ring of the bearing unit against rotation while accommodating limited tilting movement of the bearing unit in the mounting.

In accordance with this invention, an industrial bearing unit such as a sealed ball bearing composed of inner and outer race rings with a row of balls therebetween has the outer race ring provided with an outer surface of transverse arcuate contour to accommodate tilting of the unit, and a closed perimeter dimple or recess is provided in this outer race ring. A metal ball is seated freely in the dimple and projects beyond the periphery of the outer race ring.

A flange unit for mounting the bearing in position is composed of a pair of bolted together or welded together metal plates in confronting face to face relation. Each plate has an outturned arcuate collar with an inner periphery sized and shaped for embracing the outer race ring of a bearing unit in tiltable relation. One of the plates has a localized recess, preferably formed by embossing the collar of the plate at its junction with the flat face of the plate. This recess has an entrance path extending from the flat face of the plate so that the plate can be slipped over the outer race ring of the bearing and the ball carried in the dimple thereof. The opposed plate closes this entrance path and the projecting portion of the ball is thereby surrounded on all sides by a closed perimeter dimple registering with the dimple in the outer race ring of the bearing.

The bearing can thereby tilt relative to the flange unit throughout an arc limited by the permissible anti-friction movement of the ball in the registering dimples. At the same time, the ball is effective to hold the outer race ring of the bearing unit against rotation in the flange unit. The flange unit is easily bolted in position to a supporting wall or other hanger and the plates constituting the flange unit are inexpensively pressed from sheet metal.

It is, then, an object of this invention to provide a mounting for bearings and the like wherein a member interposed between the bearing and the mounting is loosely fitted in registering dimples in the mounting and bearing for holding the bearing against rotation in the mounting while accommodating limited tilting movement of the bearing in the mounting.

Another object of the invention is to provide a flange unit for bearings composed of stamped metal plates each having outturned arcuate collars adapted to embrace the arcuate outer wall of an industrial bearing unit and equipped with a localized recess for loosely receiving a retaining member extending between said bearing unit and flange unit to hold the bearing unit against rotation in the flange unit.

A further object of the invention is to provide an inexpensive pressed metal flange hanger for bearings which will accommodate limited tilting movement of the bearing but will hold the bearing against creeping.

Another object of the invention is to provide a flange mounting for an industrial bearing unit which is composed of a pair of stamped plates at least one of which has a localized axially extending groove therein with an entrance path closed by the other plate.

Other and further objects of the invention will become apparent to those skilled in the art from the following detailed descriptions of the annexed sheets of drawings which, by way of preferred examples only, illustrate several embodiments of the invention.

On the drawings:

Figure 1 is a plan view of a flange mounting and bearing unit assembly according to this invention.

Figure 2 is a vertical cross-sectional view taken along the line II—II of Figure 1.

Figure 3 is a fragmentary vertical cross-sectional view taken along the line III—III of Figure 2.

Figure 4 is an exploded vertical cross-sectional view, with parts in elevation, showing the manner in which the flange unit of this invention can be easily assembled on a bearing unit.

Figure 5 is a cross-sectional view similar to Figure 2 but with parts in elevation and with the bearing unit tilted to the right.

Figure 6 is a view similar to Figure 5 but showing the bearing unit tilted to the left.

Figure 7 is a plan view similar to Figure 1 but showing a modified embodiment of the flange unit wherein the plates are spot-welded together.

Figure 8 is a fragmentary cross-sectional view taken along the line VIII—VIII of Figure 7.

As shown on the drawings:

As best shown in Figures 1 and 2, the flange unit 10 of this invention mounts a sealed ball bearing unit B.

The flange unit 10 is composed of a pair of metal disk plates 11 and 12. The plate 11 has a flat annular portion 11a in mating face engagement with an identical flat annular portion 12a of the plate 12. Registering holes 11b and 12b are provided in these annular portions 11a and 12a to define mounting holes 13 for a purpose to be hereinafter described.

The plate 11 has an outturned arcuate collar portion 11c around the inner periphery of the flat annulus portion 11a. This collar 11c has an inner periphery sized for embracing the outer race ring of the bearing unit B as will be hereinafter more fully described.

The plate 12 has a collar 12c similar to the collar 11c but additionally equipped with a localized embossed portion 12d defining an axially extending groove or a recess 14 having an entrance path 14a at the junction between the flat annular portion 12a and the collar 12c. This entrance path 14a is closed by the confronting face of the annular portion 11a of the plate 11 when the flange unit is mounted in position. The groove 14 is thereby provided with a surrounding wall.

The bearing unit B is composed of an inner race ring 15, an outer race ring 16, a ring of ball bearings 17 in a cage 18 between the race rings 15 and 16 and rotatably mounting the inner race ring in the outer race ring. Seals 19 extend between the inner and outer race rings to define a closed chamber between the rings for the ball bearings 17. The inner race ring 15 extends, at least on one side, beyond the outer race ring and this extending portion receives a set screw 20 in threaded engagement.

The outer race ring of the bearing unit B has a transversely arcuate wall embraced by the collar portions 11c and 12c of the flange mounting and tiltable in these collar portions.

A closed perimeter recess or dimple 21 is formed in this outer race ring 16 and a metal ball 22 is carried in this dimple 21. The dimple freely receives the ball 22 but is sufficiently shallow so that the ball projects beyond the race ring 16. The dimple 21 is positioned off center to register intermediate the length of the groove 14 when the outer race ring 16 is aligned in the flange mounting 10.

As shown in Figure 4, the collar 12c of the plate 12 is adapted to be easily slipped over one-half of the outer race ring of the bearing unit 16 carrying the ball 22 since the entrance mouth 14a of the recess will permit free passage of the ball into the recess. When the confronting plate 11 is slipped over the other half portion of the outer race ring 16, the annulus 11a of this plate will span the entrance mouth 14a of the recess 14 so that the ball is confined, in effect, in two opposed closed perimeter recesses or dimples.

As shown in Figure 5, the flange unit 10 receives bolts 23 through the bolt holes 13 thereof and these bolts simultaneously draw the plates 11 and 12 of the flange unit into face to face engagement and mount the plates over onto a supporting wall 24 having a hole therethrough sized for receiving the collar 12c. A shaft 26 secured in the inner race ring 15 of the bearing unit by the set screw 20 is thereby rotatably mounted relative to the wall 24 and can tilt through an appreciable arc.

As shown in Figure 5, tilting of the shaft to the right will move the left hand side of the dimple against the ball 22 and in turn will move the ball 22 against the right hand side of the recess 14.

As shown in Figure 6, tilting of the shaft to the left will move the right hand side of the dimple 21 against the ball and will move the ball against the face of the plate 11 closing the entrance 14a of the recess 14.

The degree of permissible tilt of the bearing unit is controlled by the relative sizes of the dimple 21 and groove 14 forming a run for the lock ball 22. The amount of movement is such, however, that the dimple 21 will never extend beyond the collar 12c nor will the groove 14 be uncovered by the outer race ring 16. Dirt can therefore not enter the dimple or groove to interfere with movement of the ball.

As shown in Figure 3, the groove 14 confines the ball 22 against appreciable circumferential movement relative to the collar 12c and the race ring 16 so that the ball is effective to hold the race ring 16 against rotation about its axis in the flange unit.

In the embodiment shown in Figure 8, flange unit 10a is composed of confronting plates substantially identical with plates 11 and 12 of the unit 10 but only three bolt holes 13a are provided, and the plates are welded in face to face engagement by spot welds 27. Spot welds 27 alternating with the holes 13a are preferred.

From the above description it will therefore be understood that this invention provides an inexpensive easily made flange unit for industrial bearings wherein the industrial bearing unit is held against rotation in the flange unit but can tilt throughout a limited arc in the flange unit.

It will be understood that modifications and variations may be effected without departing from the scope of the novel concepts of the present invention.

I claim as my invention:

1. In combination a bearing unit including a bearing ring having a transversely arcuate outer surface with a closed perimeter dimple positioned off center in said outer surface, an anti-friction ball rotatably seated in said dimple, and a flange mounting for said bearing unit including a pair of plates having respective annular portions secured in confronting register centrally about said bearing ring, and collar portions out-turned from the inner periphery of the respective annular portions and converging arcuately to a lip to embrace said bearing ring in tiltable relation, one of said collar portions having an inwardly opening groove extending axially from an entrance mouth in the inner periphery of the respective annular portion and terminating short of the collar lip, said groove being positioned to receive said ball intermediate its length when said bearing ring is alined in said flange mounting thereby to serve as an axial run for said ball accommodating limited tilting of said bearing ring while holding said bearing ring against rotational creeping in said flange mounting.

2. In combination a bearing unit including a bearing ring having a transversely arcuate outer surface with a closed perimeter dimple therein, a ball seated in said dimple, and an annular bearing mounting having a transversely arcuate inner surface contoured to embrace said bearing ring in tiltable relation, said inner surface having an inwardly opening axially extending closed perimeter groove receiving said ball intermediate its length when said bearing ring is aligned in said annular mounting, said groove being contoured to serve as an axial run for said ball to restrain said bearing ring from rotational creeping while permitting its limited tilting out of alignment with said annular mounting.

References Cited in the file of this patent

UNITED STATES PATENTS

| Number | Name | Date |
|---|---|---|
| 791,086 | Deutsch | May 30, 1905 |
| 2,083,688 | Clements | June 15, 1937 |
| 2,290,213 | Shafer | July 21, 1942 |